Le R. WHITFORD.
Potato-Coverers.
No. 153,793.                                 Patented Aug. 4, 1874.
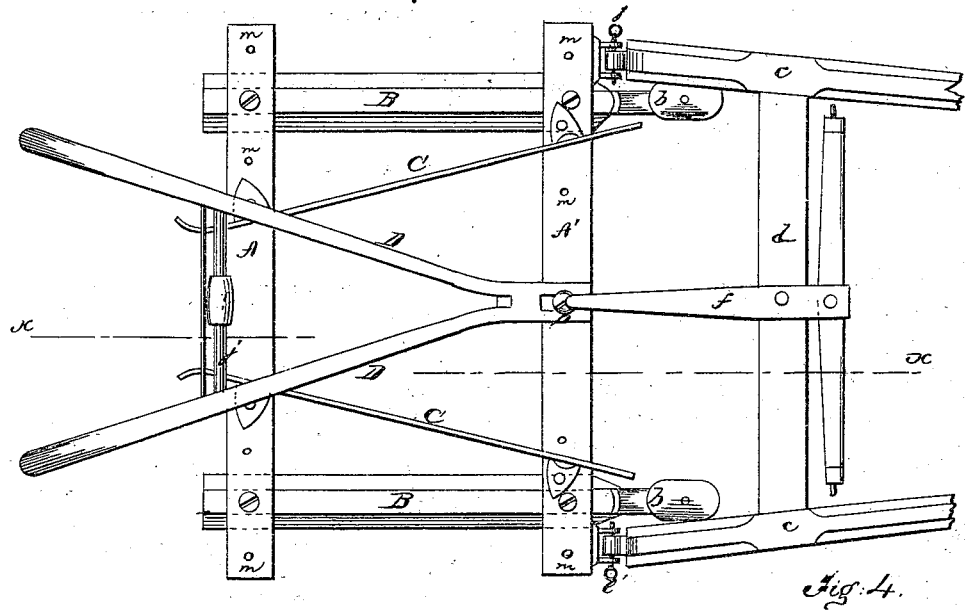
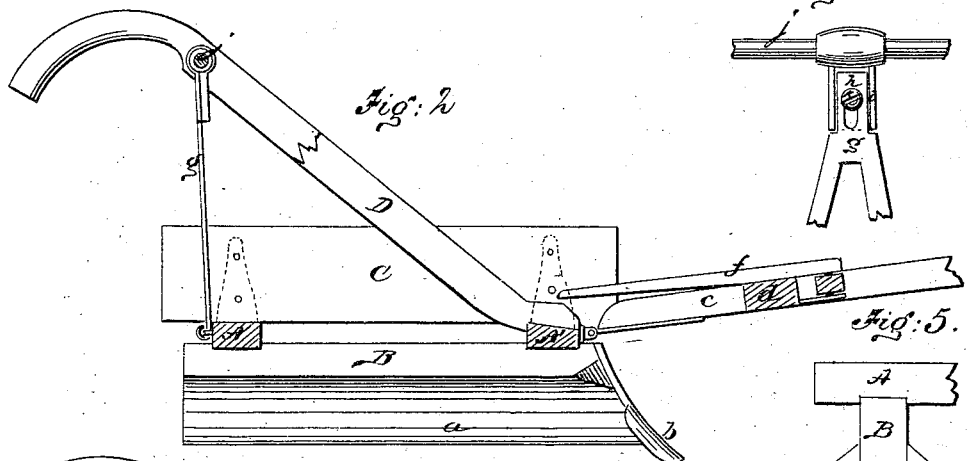
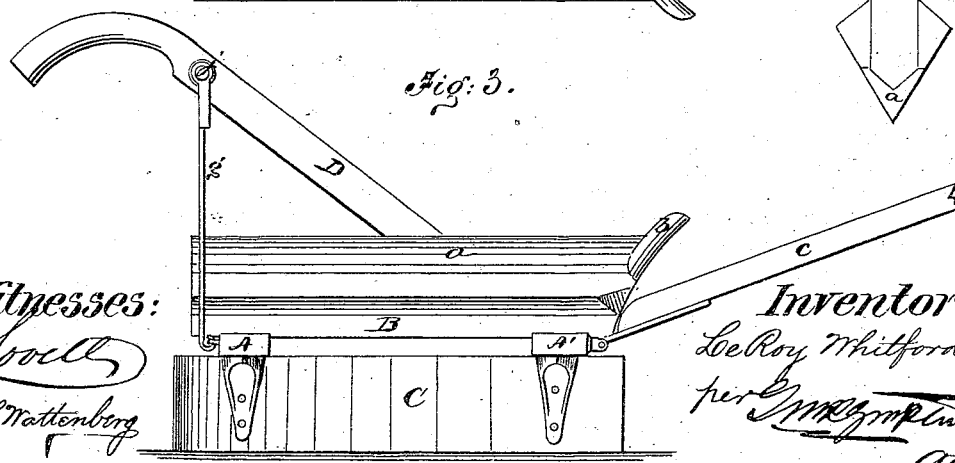
Witnesses:
W. Lovell
H. L. Wattenberg
Inventor:
LeRoy Whitford
per J. M. Simpkin
Atty

UNITED STATES PATENT OFFICE.

LE ROY WHITFORD, OF HARMONY, NEW YORK.

IMPROVEMENT IN POTATO-COVERERS.

Specification forming part of Letters Patent No. 153,793, dated August 4, 1874; application filed January 20, 1874.

*To all whom it may concern:*

Be it known that I, LE ROY WHITFORD, of Harmony, in the county of Chautauqua and State of New York, have invented a new and Improved Potato-Planter; and that the following is a full, clear, and exact description of the same, reference being had to the accompanying drawings, and to the letters of reference marked thereon, making a part of this specification.

This invention is in the nature of an improved implement for planting and hoeing potatoes, &c.

In the drawings, Figure 1 represents a plan or top view of my implement when arranged for furrowing or drilling; Fig. 2, a side elevation of same; Fig. 3, a side elevation of implement arranged for hilling or ridging; Fig. 4, detail showing manner of attaching brace to handle; and Fig. 5, end view of furrow-guide.

Similar letters of reference indicate like parts in the several figures.

A A' are two cross-beams, which form the foundation of my implement. Secured transversely on one side of these cross-bars, in any desirable manner, as by screws or otherwise, are two furrow-guides, B B, these guides on their lower sides being suitably armed with metal $a$, and having the form of a V or acute angle. (See Fig. 5.) The front ends of the guides B are concave or curved, as shown in Fig. 2, and have fitted to them shoes $b\ b$. Onto the other side of the cross-bars A A' are secured, in any suitable manner, and in an angular position, two steel plates, C C, (see Figs. 1 and 2,) and to one of said cross-bars, A', are attached the thills $c$. To the cross-bar $d$ of the thills $c$ is firmly secured a tongue, $f$, and to the cross-bars A A' are affixed the handles D. These handles are in form similar to the handles of a plow, and are secured at their front ends to the cross-bar A' by a screw, $p$, or in any desirable way, and to the cross-bar A by a tie-brace, $g$. This tie-brace is bifurcated, the fork being hinged to the cross-bar A, and its upper end being provided with the tongue $h$, which fits into a recess or socket, $i$, which is secured to and projects from the brace $j$ of the handles, the tongue of the tie-brace being held within the socket by a screw, $k$.

My implement being constructed substantially as above described, its operation is substantially as follows:

When it is desired to use the implement for planting potatoes or other similar products, the implement is arranged as shown in Figs. 1 and 2—that is to say, with the furrow-guides in contact with the ground, the handles being secured to the other side of the cross-bars A A' in the manner hereinbefore mentioned, and the thills being properly adjusted to the cross-bar A'. A horse draws the implement along the surface of the ground, it being at the same time guided by a man at the handles. As it proceeds, the shoes $b\ b$ enter the surface, and turn two furrows, the angular furrow-guides B entering and fitting into the furrows thus turned, keeping the implement steady, and at the same time insuring the furrows being exactly parallel. The potatoes or other seed may be dropped as soon as the furrows are made, by following the machine, or they may be planted at any time it is desired to do so. After planting, and when necessary to cover the seed, the handles D are detached from the cross-bars A A' by withdrawing the screw $p$, and turning down the tie-brace $g$, and detaching the thills from the cross-bar A' by withdrawing the bolts $l\ l'$, and the implement upset or turned over, bringing the ridging-plates C C onto the ground, the furrow-guides being uppermost, as shown in Fig. 3. The thills $c$ being then readjusted to the cross-bar A', and the handles D being secured to the cross-bars, as before described—that is, by turning up the tie-brace $g$, and securing it to the socket $i$, and securing the end of the handles to the cross-bar A' by the screw $p$—the horse proceeds to draw the implement in such a manner as will bring the previously-made furrow midway between the ridging-plates C C, these plates gathering up the soil between them at their front ends as the implement advances, and delivering it at their contracted rear ends, thus forming and molding as it were onto the furrow over which it passes a uniform ridge of earth, completely covering the seed that had been deposited.

The space between the furrows and the width of the ridge to be formed may be adjusted as circumstances may require by simply moving the relative positions of the furrow-guides and ridging-plates on the cross-bars. This may be easily accomplished, since both the guides and plates are secured to the cross-bars by set-screws, which can be fitted into the additional holes $m$ made in the cross-bars for this purpose.

When it is desired to change the direction of the implement, as at the end of a furrow, it is simply necessary to lift a little on the handles, when the tongue $f$ will enter into a recess formed in the front end of the plow-handles, and, bearing against it, enable the horse to assist in lifting the implement clear from the ground, so that it can be turned without difficulty.

By changing the position of the thills on the cross-bars, the ridging-plates may be used advantageously for gathering up the soil about the plants after they shall have commenced to grow, and in this way the implement may be used to produce the same effect as hoeing or hilling.

Besides the uses hereinbefore mentioned to which this implement can be put, it can be made useful for many other purposes, such as depositing manure (previously spread on the surface) in the furrows.

Having thus described my invention, what I claim as new, and desire to secure by Letters Patent, is—

1. In a furrow-opener and ridging-machine, the reversible handles D, combined with the tie-brace $g$ and socket $i$, substantially as and for the purpose set forth.

2. The thills $c$, having a tongue, $f$, which enters a recess formed in the front end of the handles to assist in turning the implement, substantially as described.

In testimony whereof I have hereunto signed my name this 13th day of January, 1874.

LE ROY WHITFORD.

Witnesses:
T. S. BLY,
H. H. BLY.